United States Patent
Yuzurihara et al.

(10) Patent No.: US 7,260,044 B2
(45) Date of Patent: Aug. 21, 2007

(54) RECORDING METHOD FOR A PHASE-CHANGE OPTICAL RECORDING MEDIUM

(75) Inventors: Hajime Yuzurihara, Kanagawa (JP); Hiroshi Deguchi, Kanagawa (JP); Eiko Hibino, Kanagawa (JP); Mikiko Abe, Kanagawa (JP); Hiroshi Miura, Kanagawa (JP); Kazunori Ito, Kanagawa (JP); Michiharu Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 474 days.

(21) Appl. No.: 10/653,938

(22) Filed: Sep. 4, 2003

(65) Prior Publication Data

US 2004/0076099 A1    Apr. 22, 2004

(30) Foreign Application Priority Data

| Sep. 6, 2002 | (JP) | ............................. 2002-261281 |
| Dec. 18, 2002 | (JP) | ............................. 2002-367401 |
| Dec. 26, 2002 | (JP) | ............................. 2002-378460 |
| Jul. 25, 2003 | (JP) | ............................. 2003-201448 |

(51) Int. Cl.
*G11B 7/0045* (2006.01)

(52) U.S. Cl. ................................. 369/59.12

(58) Field of Classification Search ...................... None
See application file for complete search history.

(56) References Cited

U.S. PATENT DOCUMENTS

| 5,732,062 A | 3/1998 | Yokoi et al. |
| 5,790,505 A | 8/1998 | Abe et al. |
| 5,847,466 A | 12/1998 | Ito et al. |
| 5,976,971 A | 11/1999 | Kinpara et al. |
| 6,018,510 A | 1/2000 | Abe et al. |
| 6,044,055 A | 3/2000 | Hara |
| 6,096,398 A | 8/2000 | Yuzurihara et al. |
| 6,177,167 B1 | 1/2001 | Yuzurihara et al. |
| 6,391,417 B1 | 5/2002 | Yuzurihara et al. |
| 6,426,936 B1 | 7/2002 | Shinotsuka et al. |
| 6,479,121 B1 | 11/2002 | Miura et al. |
| 6,500,598 B2 * | 12/2002 | Ichihara ................. 430/270.13 |
| 6,548,137 B2 * | 4/2003 | Ito et al. .................... 428/64.1 |
| 6,754,158 B1 * | 6/2004 | Kobayashi et al. ...... 369/59.11 |
| 6,909,682 B2 * | 6/2005 | Kando et al. ............ 369/59.24 |
| 2001/0041240 A1 | 11/2001 | Ito et al. |
| 2001/0053115 A1 | 12/2001 | Nobukuni et al. |
| 2002/0021643 A1 | 2/2002 | Miura et al. |

(Continued)

FOREIGN PATENT DOCUMENTS

CN          1180888 A          5/1998

(Continued)

*Primary Examiner*—William Korzuch
*Assistant Examiner*—Joseph Haley
(74) *Attorney, Agent, or Firm*—Dickstein Shapiro LLP

(57) ABSTRACT

The present invention provides a recording method for a phase-change optical recording medium. The recording method of the present invention contains the step of irradiating an electromagnetic wave having a multipulse pattern so as to perform recording on a phase-change optical recording medium containing a phase-change recording layer. This method is characterised in that a starting time of a front pulse of the multipulse pattern delays 0.5T to 1.25T from a starting point of the first reference clock relative to the recording mark, where T is a reference clock of the multipulse pattern.

14 Claims, 8 Drawing Sheets

U.S. PATENT DOCUMENTS

| | | |
|---|---|---|
| 2002/0098445 A1 | 7/2002 | Harigaya et al. |
| 2002/0110063 A1 | 8/2002 | Yamada et al. |
| 2002/0145963 A1 | 10/2002 | Narumi et al. |
| 2002/0155248 A1 | 10/2002 | Ito et al. |
| 2002/0160306 A1 | 10/2002 | Hanaoka et al. |
| 2002/0163876 A1 | 11/2002 | Shinotsuka et al. |
| 2003/0003395 A1 | 1/2003 | Yuzurihara et al. |
| 2003/0012917 A1* | 1/2003 | Harigaya et al. .......... 428/64.4 |
| 2004/0141447 A1* | 7/2004 | Yuzurihara et al. ...... 369/59.11 |
| 2005/0169149 A1 | 8/2005 | Ito et al. |

FOREIGN PATENT DOCUMENTS

| | | |
|---|---|---|
| EP | 1 260 973 A | 11/2002 |
| EP | 1 304 686 A2 | 4/2003 |
| EP | 1 385 160 A2 | 1/2004 |
| JP | 08-287465 | 11/1996 |
| JP | 2844996 | 10/1998 |
| JP | 2941703 | 6/1999 |
| JP | 3124720 | 10/2000 |
| JP | 2000-322740 | 11/2000 |

* cited by examiner

RECORDING METHOD FOR A PHASE-CHANGE OPTICAL RECORDING MEDIUM

BACKGROUND OF THE INVENTION

1. Field of the Invention

The present invention relates to a recording method of a phase-change optical disk, namely, a rewritable optical disk. This method is suitably applied for a high volume optical medium, DVD+RW, or the like.

2. Description of the Related Art

Phase-change recording media, which are used for CD and DVD rewritable recording media have rapidly become very popular due to their high capacity, high-speed recording, and high compatibility with ROM (Read Only Memory). In recent years, it is required that recording/reproducing of mass image data is carried out at high speed, and higher speeds are being demanded of phase-change recording media. However, it is desirable that a high linear velocity recording disk which can be recorded at a high linear velocity, should be able to be recorded also in a low-speed drive for low linear velocity recording disks which record at a low linear velocity. This is possible with CD-R, which can record over a wide range of linear velocity.

However, in the case of the above-mentioned phase-change recording medium, it is difficult to perform recording over a wide range of linear velocity. In order to perform recording at a high linear velocity, a high power laser which outputs a high recording power is required. The recording power of the laser light used in a low-speed drive is usually lower than the recording power of the laser light output in a high-speed drive for high linear velocity recording. Hence, it is difficult to record a high linear velocity recording disk in a low-speed drive.

The aforesaid phase-change recording medium is usually optimized for recording at a high linear velocity. In the case of a phase-change recording medium designed in this way, the recording power to record is higher than the optimal recording power for a low recording linear velocity. Thus, in order to perform recording at a lower recording power with this phase-change optical recording medium, the sensitivity of this phase-change optical recording medium must be increased. In order to increase sensitivity of this phase-change optical recording medium, the reflectance of this phase-change optical recording medium can be lowered. However, when designing this phase-change optical recording medium as a DVD, it is necessary to maintain compatibility with DVD-ROM. Thus, the above-mentioned reflectance cannot be made lower as desired.

The highest recording linear velocity in rewritable DVD currently commercialized in the past several years is 2.4×. A phase-change optical recording medium, which can be recorded at a higher recording linear velocity than 2.4× and also in a low-speed drive, namely, which is downward compatible, has not yet been provided.

In order to provide downward compatibility, it is required to select the composition of the above-mentioned phase-change optical recording medium and the material of the recording layer, and optimize the recording conditions of this phase-change optical recording medium, so that it is recordable at a low recording power and the recording power margin is large.

In the prior art, for example in Japanese Patent (JP-B) No. 3124720 or Japanese Patent Application Laid-Open (JP-A) No. 2000-322740, by controlling the pulse-width of a laser pulse-like waveform, it can be made CAV (Constant Angular Velocity) recording possible at 2.4×. In the case of rewritable DVD, however, there is a problem that it is difficult to realize a recording linear velocity higher than 2.4× together with downward compatibility so that recording can also be performed in a low-speed drive.

In JP-B No. 2844996, for example, instead of using a fixed erasing power for high speed recording, a method of modulating the erasing power by the reproduction power range is disclosed. However, in the case of this method, a sufficient erasure cannot be performed, and there is the problem that an amorphous phase may be formed depending on the level of the erasing power.

Also, for example, in JP-B No. No. 2941703, a method wherein a rear edge cooling pulse interval is basically eliminated when forming a record mark, is described. However, in the case of this method, there is a problem that it is difficult to form a record mark of predetermined length.

In the case of DVD, such phase-change optical recording medium and recording method thereof are required that recording can be performed at a recording linear velocity as fast as 4× (as 1× linear velocity is 3.49 m/s, this is approx. 14 m/s (13.96 m/s)), and also with a recording power below the optimal recording power of a phase-change recording medium for recording of a recording linear velocity of 1× to 2.4×.

In this regard, it is important to optimize the crystallization rate of the recording layer in the phase-change optical recording medium. In the recording layer, the overwrite characteristics, particular the characteristics of the first overwrite, deteriorate when recording is performed at a high linear velocity. Hence, to enable recording at a high linear velocity, it is important to optimize the elements and elemental composition of this recording layer so that the crystallization rate in this recording layer increases.

In order to form a record mark (amorphous phase) in the aforesaid recording layer in the case of the aforesaid phase-change optical recording medium, it is necessary to heat the material of this recording layer to near the melting point thereof and to perform quenching in a short time. The crystallization rate in the recording layer is larger, the larger is the temperature gradient over time, and the longer is the non-heating time (cooling time) required to suppress recrystallization is longer. However there is a limit to the heating time and cooling time. During recording at a high linear velocity where it is difficult to raise the temperature in a short time, therefore, the recording power must be increased. Also when recording at a low linear velocity, the aforesaid crystallization rate in the aforesaid recording layer is large, so the recording power must likewise be increased.

Accordingly, in a phase-change optical recording medium for recording at a high linear velocity, the aforesaid crystallization rate cannot be made too high. Consequently, if a fixed erasing power is irradiated, an amorphous phase is easily formed even if the erasing power is not so high, and the erasing power cannot be increased too much, the higher is the linear velocity. For this reason, the above-mentioned crystallization rate may be optimized at an intermediate linear velocity between a low linear velocity and a high linear velocity. However, in this case, the erasing power is not sufficient for a high linear velocity, and mark erasure properties during overwrite are poor.

SUMMARY OF THE INVENTION

It is therefore an object of the present invention, which resolves the problems inherent in the prior art, to provide a recording method suitable for a phase-change optical recording medium which can record at a high linear velocity, and which when recording at a low linear velocity, can record at almost the same recording power as a phase-change optical recording medium suitable for a low linear velocity. It further aims to provide a recording method which provides good overwrite characteristics in CAV recording or CLV (Constant Linear Velocity) recording.

The first aspect of the recording method for a phase-change optical recording medium of the present invention comprises the step of irradiating an electromagnetic wave having a multipulse pattern so as to perform recording, erasing and overwriting on a phase-change optical recording medium containing a phase-change recording layer, in which the multipulse pattern contains pulses of a peak power (Pp), an erasing power (Pe) and a bias power (Pb), where the pulses of the peak power contain a front heating pulse (OP1), an intermediate heating pulse (OPj) and a rear heating pulse (OPm), and the pulses of the bias power contain a front cooling pulse (FPl), an intermediate cooling pulse (FPj) and a rear cooling pulse (FPm). Here, a starting time of a front pulse delays 0.5T to 1.25T (T: a reference clock of the multipulse pattern) from a starting point of the first reference clock relative to the recording mark. In this recording method, several aspects are preferred: (1) an ending time of a rear pulse is T−OPm or less, earlier than an ending point of the last reference clock relative to the recording mark; (2) the starting time of the front pulse delays more than 1T, and 1.25T or less, from the starting point of the first reference clock, with a maximum recording linear velocity among recordable recording linear velocities to the phase-change optical recording medium; (3) the ending time of the rear pulse is T−OPm earlier than an ending point of the last reference clock, with the maximum recording linear velocity; (4) recording is performed at a recording linear velocity within a range of an intermediate recording linear velocity to the maximum recording linear velocity with respect to the recordable recording linear velocity to the phase-change optical recording medium.

In the second aspect of the recording method of the present invention, when a recording linear velocity is continuously changes with respect to an inner circumference to an outer circumference of the phase-change optical recording medium, pulse widths of the front heating pulse (OPl), the intermediate heating pulse (OPj), and the rear heating pulse (OPm) are controlled by adjusting a sum of a time which is proportional to the reference clock relative to a recording linear velocity within a range of the minimum recording linear velocity and the intermediate recording linear velocity and a time being independent from the reference clock, or, a time which is proportional to the reference clock relative to a recording linear velocity within a range of one-third of the maximum linear velocity to the maximum linear velocity. In this recording method, if the aforesaid pulse widths are controlled by adjusting the sum of the time which is proportional to the reference clock relative to a recording linear velocity within a range of the minimum recording linear velocity and the intermediate recording linear velocity and the time being independent from the reference clock, the method is preferably applied with a recording linear velocity within the range of the minimum recording linear velocity to the intermediate recording linear velocity, and a recording linear velocity within the range of the one-third of the maximum recording linear velocity to the maximum recording linear velocity.

In the third aspect of the optimal recording method of the present invention, in a case of recording only with the maximum recording linear velocity regardless to a recording position on the phase-change optical recording medium, the aforesaid pulse widths are controlled by adjusting a sum of the time which is proportional to the reference clock and the time being independent from the reference clock. Here, the time independent from the reference clock is 0.5 nano seconds or more.

In the fourth aspect of the recording method of the present invention, the multipulse pattern further contains at least one compensation pulse which includes a pulse of the erasing power Pe and a pulse of a second erasing power Pe2 after the rear cooling pulse. Here, the second erasing power Pe2 is higher than the erasing power Pe. In this aspect of the recording method, a few aspects are preferred: (1) the compensation pulse is contained in the multipulse pattern when at least the shortest record mark is recorded among recordable record marks with the phase-change optical recording medium and the recording linear velocity; and (2) at least the maximum recording linear velocity is applied so as to perform recording.

DESCRIPTION OF THE PREFERRED EMBODIMENTS

Figure 1:
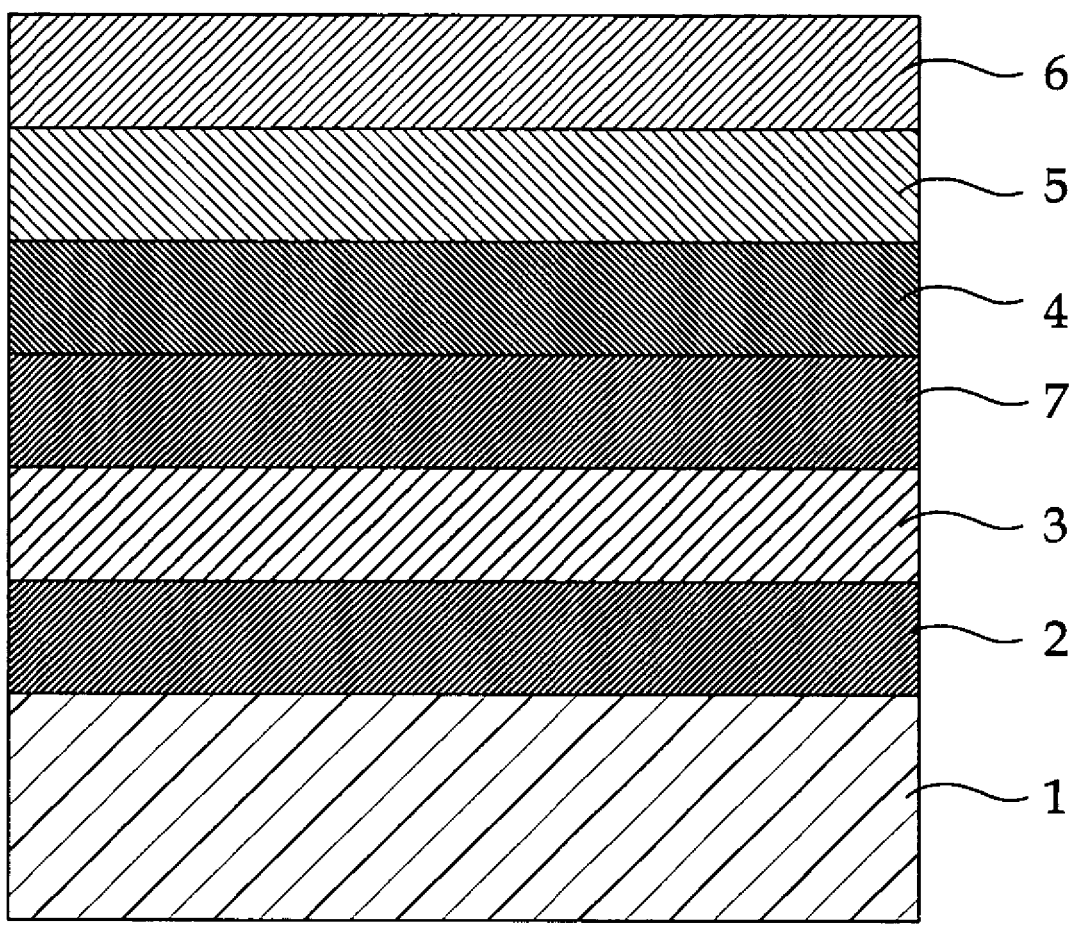
FIG. 1 is a cross-sectional view showing an example of the laminar structure of the phase-change optical recording medium used by the present invention.

As shown in FIG. 1, the phase-change optical recording medium used by the present invention is formed by laminating a transparent substrate 1, lower dielectric protective layer 2, phase-change recording layer 3 which undergoes a reversible phase-change between an amorphous phase and a crystalline phase, an interface layer 7, upper dielectric protective layer 4, anti-sulfuration layer 5 and reflective layer 6, in that order. The interface layer 7 is not indispensable.

For the aforesaid transparent substrate 1, plastic or glass, such as transparent polycarbonate (PC), polymethacrylic acid (PMMA) or the like, which is transparent to the wavelength of the recording/reproducing light, may be used.

There is no particular limitation on the material of the lower dielectric protective layer 2 disposed between the transparent substrate 1 and the phase-change recording layer 3, and the material of the upper dielectric protective layer 4 disposed between the phase-change recording layer 3 and the reflective layer 6. Although they may be selected according to the purpose, examples are metal oxides such as $SiO_x$, ZnO, $SnO_2$, $Al_2O_3$, $TiO_2$, $In_2O_3$, MgO, $ZrO_2$, $Ta_2O_5$, or the like; nitrides such as $Si_3N_4$, AlN, TiN, BN, ZrN, or the like;

sulfides such as ZnS, TaS$_4$, or the like; and carbides such as SiC, TaC, B$_4$C, WC, TiC, Zr or the like.

These materials can also be used alone or in admixture. Of these, a mixture of ZnS and SiO$_2$ is generally used as the phase-change recording medium. As the mixing ratio thereof, 80:20 (molar ratio) is satisfactory. The aforesaid lower dielectric protective layer 2 preferably has a low thermal conductivity, and its specific heat is small. It is preferred that crystallization is not caused by overwriting, cracking is not occurred by repeated heating/quenching cycles, and there is no elemental diffusion. ZnS—SiO$_2$ (80:20) satisfies these conditions, and is used also for the upper dielectric protective layer 4. In mixtures wherein ZrO$_2$ contains 3 mol % to 6 mol % of Y$_2$O$_3$, the refractive index is almost the same as or is larger than that of ZnS—SiO$_2$, and its thermal conductivity is also low.

When the bulk thermal conductivity was measured by the laser flash process, in a type of the bulk containing ZrO$_2$ as the main ingredient, ZrO$_2$.Y$_2$O$_3$ (3 mol %), ZrO$_2$.SiO$_2$ (5 mol %).Y$_2$O$_3$ (3 mol %), ZrO$_2$.TiO$_2$ (50 mol %).Y$_2$O$_3$ (3 mol %), and ZrO$_2$.TiO$_2$ (40 mol %).SiO$_2$ (20 at %).Y$_2$O$_3$ (3 mol %) were respectively 5.1, 3.5, 1.73, 2.6 (W/m·K), and ZnS.SiO$_2$ (20 mol %) was 8.4 (W/m·K).

The refractive index (n) was 2 or more in all cases except for ZrO$_2$.SiO$_2$ (5 mol %). MgO may be used instead of Y$_2$O$_3$. All these materials are generally used for preventing cracking of the target when a target is manufactured for film-forming by a sputtering method.

For references, phase-change optical recording mediums were formed using these materials for the upper dielectric protective layer 4, and the storage properties of record mark thereon were examined at 80° C. and 85% RH after recording. If the content of ZrO$_2$ is 50 at % or more, the mark disappeared or jitter deterioration was large. However, the repeat overwrite characteristics of ZrO$_2$ containing materials are good, and there was less jitter degradation after recording 1,000 times than with ZnS.SiO$_2$. There is more effect in overwriting at a high linear velocity.

However, as the aforesaid dielectric protective layer 4, ZnS—SiO$_2$ (80:20) is more suitable.

In this regard, in order to harness the effect which improves this overwrite characteristic, the effect of providing a ZrO$_2$ material as an interface layer disposed between the phase-change recording layer and the upper dielectric protective layer was examined.

As a result, it was found that when the thickness was within a range of 1 nm to 5 nm, this effect was maintained and deterioration of storage reliability was considerably suppressed.

The interface layer has the following effect. This layer is in a crystalline state and the lattice constants thereof is close to that of the aforesaid phase-change recording layer so that this interface layer encourages crystal growth of the phase-change recording layer. Although the interface layer is not in a crystallized state, it assists crystal growth so as to increase the erasure ratio and improve overwrite characteristics.

Moreover, as wettability is poor, when the recording layer is in a molten state, fluidity is suppressed and local volume change of this recording layer is suppressed, overwrite characteristics also improve.

The thickness of the lower dielectric protective layer is within a range of about 40 nm to about 250 nm, and preferably within a range of 45 nm to 80 mm. If the thickness is less than about 40 nm, environment-proof protective functions are reduced, the heat dissipation effect is lowered so that deterioration of repeat overwrite characteristics increases. If the thickness is more than about 250 nm, in the film-forming process by sputtering or the like, film peeling or cracking occurs due to the rise of film temperature.

Moreover, the thickness of the transparent substrate is less than 0.6 mm. If the thickness of the transparent substrate reaches 0.6 mm, deformation of the transparent substrate may increase, and after sticking, it may be impossible to correct the deformation.

The thickness of the upper dielectric protective layer is in a range of about 5 nm to about 50 nm, and preferably in a range of 8 nm to 20 nm. If the thickness is less than about 5 nm, recording sensitivity will fall, whereas if the thickness is more than about 50 nm, deformation occurs due to temperature rise, and repeat overwrite characteristics will worsen due to lower heat dissipation properties.

The aforesaid reflective layer may comprise a metallic material, such as Al, Ag, Cu, Pd, Cr, Ta, Ti and the like. The thickness thereof is preferably within a range of 50 nm to 250 nm. If the reflective layer is excessively thick, heat dissipation properties are more improved, but due to temperature rise of the medium while producing the thin film, deformation of the substrate does occur. If the reflective layer is excessively thin, heat dissipation properties will worsen and recording properties will deteriorate.

The characteristics of the above-mentioned reflective layer are improved by using Ag which has a higher thermal conductivity. For this reason, Ag or Ag alloy is suitably used.

When the linear velocity increases, the cooling rate will become large. Accordingly, an amorphous mark is easily formed, but as the recording layer is heated to near its melting point when the mark is formed, the heating pulse time of the light emission pulse had to be lengthened. On the other hand, if the heating time is lengthened, the cooling time is shortened so the cooling time may not be sufficient and it will become difficult to form a mark. This is because the sum of the pulse times of one heating and cooling is a reference clock, and changes are made within these limitations.

Thus, in order to improve the cooling efficiency of the medium, Ag may be suitably used. However, when the upper dielectric protective layer contains S (sulfur) and the reflective layer is Ag, Ag$_2$S is easily formed under high temperature and high humidity. This leads to characteristic degradation and generates defects, which poses a problem.

It is then necessary to provide an anti-sulfuration reaction layer between the reflective layer and the upper dielectric protective layer. As a result of intensive studies on oxides, nitrides, carbides and metals performed so far, preferable materials for the anti-sulfuration reaction layer are Si and SiC, and ZrO$_2$, MgO and TiO$_x$ are also suitable. SiC prevents the reaction of Ag and S, and the effect thereof is large even with the thickness of as thin as 3 nm. The thickness of the anti-sulfuration reaction layer is within a range of about 2 nm to about 10 nm. If the thickness is more than 10 nm, it will separate from the reflective layer, so the heat dissipation efficiency falls and as the absorption constant is high, and the reflectance tends to fall.

By using Ag alone for the reflective layer, properties improve. In view of the corrosivity of Ag itself and adhesion to the anti-sulfuration layer when Ag is used alone, by optimizing sputtering conditions (argon gas pressure) during thin film production, the crystal particle size of Ag is reduced, and by suppressing particle growth, the thin film surface of Ag becomes flat and smooth. When the particle size is large, peeling easily occurs from where the adhesion is weak.

Further, to improve adhesion, Ag can still be used alone by optimizing the curing conditions and thickness of the ultraviolet-curing acrylic resin which is used as an environmental protection layer on the reflective layer. If Ag is used alone, however, there is a concern that deterioration may occur due to manufacture under less than optimum conditions, to storage conditions of the substrate before sticking without a recording film, to moisture absorption of the substrate itself and moisture absorption of the ultraviolet curing resin.

In this regard, reliability is improved by using an alloy containing 95 at % or more Ag. If the addition amount of other metallic element to Ag exceeds 5 at %, thermal conductivity considerably decreases. For this reason, the addition amount is preferably 2 at % or less.

As additional elements, Cu and Ni are preferably since they suppress particle size growth without much lowering thermal conductivity and improve environmental resistance. When producing an Ag film by sputtering, to reduce the crystal particle size of the Ag film, the power applied between the substrate and the target may be 3W or less.

The aforesaid phase-change recording layer has conventionally been based on a eutectic composition in the vicinity of Sb70Te30. AgInSbTe and AgInSbTeGe materials which contains Ag, In and Ge are suitable for high-density recording at high linear velocity, and have therefore conventionally been used. The higher is the ratio of Sb to Te or if the amount of Sb is more than 80 at %, the crystallization rate increases, but storage properties are exceedingly poor and it becomes difficult to form an amorphous phase. Therefore, a desirable amount of Sb for high linear velocity recording is within a range of 65 at % to 80 at %.

On the other hand, the amount of Te is preferably within a range of 15 at % to 25 at %. Although Ge does not increase the crystallization rate, Ge improves storage properties of the record mark under the high temperature environment and is an essential element. The binding energy of Ge and Te is large. Moreover, the larger is the Ge addition amount, the higher is the crystallization temperature which means better storage properties. However, if Ge is excessively added, the crystallization temperature further increases and the crystallization rate slows down, so 5 at % is preferred. Although Ag stabilizes record marks, the crystallization temperature can not sufficiently increase the crystallization temperature. If Ag is excessively added, the crystallization rate drops, so a large amount thereof cannot be used. On the other hand, it also has the effect of stabilizing the crystalline state, so the amount of Ag in the phase-change recording layer is preferably 3 at % or less.

In increases crystallization rate and increases crystallization temperature, so storage properties are improved. If a large amount is added, however, the material tends to segregate. Deterioration of repeat overwrite characteristics and deterioration with respect to reproduction optical power occur, so the amount of In in the phase-change recording layer is preferably 5 at % or less. In addition to In, Ga also increases the crystallization rate. Ga accelerates the crystallization rate more than an identical amount of In, but it also increases the crystallization temperature. If the amount of Ge is 5 at % and Ga is 5 at % or more, the crystallization temperature will greatly exceed 200° C. and may rise to 250° C. or more. As a result, in the initialization process for crystallizing the recording layer from the amorphous state, the reflectance distribution around the track increases, and leads to recording characteristic and data errors. For this reason, when Ga is used as a supplementary element to accelerate the crystallization rate, the amount of Ga in the phase-change recording layer is preferably 3 at % addition or less.

There is a limit to the use of AgInSbTeGe as a higher linear speed material. As a result of studying elements which replace Ag and In, it was found that although Mn accelerates the crystallization rate, it is effective as it does not increase the temperature rise more than necessary. Mn increases crystallization rate, like In. Even if a large amount thereof is used, storage properties are satisfactory without deteriorating overwrite characteristics. Although crystallization temperature also increases, the increase amount in the crystallization temperature relative to the amount of Mn is small, and reproductive photodegradation is also small. In the present invention, it is sufficient if 5 at % of Mn is added.

Thus, a GeMnSbTe material is also a suitable material for high linear velocity. Further, a GeMnSbTe material wherein Ga is added to improve crystallization rate and storage properties is also effective. The thickness of the recording layer, is preferably within a range of 10 nm to 20 nm. If the thickness thereof is less than 10 nm, the reflectance difference between the crystal phase and amorphous phase is small. If the thickness thereof is more than 20 nm, recording sensitivity and repeat overwrite characteristics will worsen.

As a material for the phase-change recording layer, apart from the aforesaid materials, Ag.In.Sb.Te, Ge.Ga.Sb.Te, Ge.Sb.Te, Ge.Sn.Sb.Te, Ge.Sn.Sb, Ge.In.Sb.Te, Ga.Sn.Sb, Ge.Ag.Sn.Sb, Ga.Mn.Sb, Ga.Sn.Sb.Se, and the like can also be used.

Recording/reproducing for the above phase-change recording medium can be performed with the recording wavelength of 400 nm to 780 nm.

In the case of DVD, a recording wavelength of 650 nm to 660 nm is used. The numerical aperture of the object lens is then set to 0.60 to 0.65, and the beam diameter of the incident light is set to 1 μm or less. Hence, the thickness of the substrate is set to 0.6 mm, and the aberration is made small.

The pitch between the grooves in which the mark is written is 0.74 μm, the depth of the grooves is 15 nm to 45 nm and the groove width is 0.2 μm to 0.3 μm.

The groove has a wobble having a frequency of approximately 820 kHz. The address part is encoded in the wobble by modulating the phase of the frequency. This phase-change is detected and decoded to a binary signal, and an address (number) is read.

The amplitude of this wobble is 5 nm to 20 nm. The recording linear density is 0.267 μm/bit, and recording is performed using the (8-16) modulation method. In this case, the shortest mark length will be 0.4 μm. 2× of DVD is recorded at a linear velocity of 7 m/s (6.98 m/s) and with the reference clock whose frequency is set to 52.3 MHz (T:19.1 nanoseconds, T is a reference clock). 4× of DVD is recorded at a linear velocity of 14 m/s (13.96 m/s), and with the reference clock whose frequency is set to 104.6 MHz (T:9.56 nanoseconds). The linear velocity is changed from 1× to 4× while irradiating an erasing power of fixed magnitude continuously or at regular intervals to the phase-change optical recording medium. If the reflective signal strength at this time is measured, the reflective intensity begins to decrease from a certain linear velocity, and at a higher linear velocity, the reflective intensity further decreases, and eventually becomes saturated.

When a substrate surface of the phase-change optical recording medium is measured using a pickup of wavelength 659 nm and NA 0.65, and a 12 mW erasing power is irradiated, the linear velocity at which reflectance begins to fall is from 9 m/s to 10.5 m/s.

Conventionally, a phase-change optical recording medium optimized at 4× requires a higher recording power than a recording power required for a medium optimized at a lower linear velocity. In order to make recording possible by the same recording power as a phase-change optical recording medium corresponding to from 1× to 2.4×, the linear velocity at which the reflectance begins to fall is preferably earlier than 2.4×, i.e., 8.4 m/s, and more preferably 0.5 m/s to 1 m/s.

Figure 2:
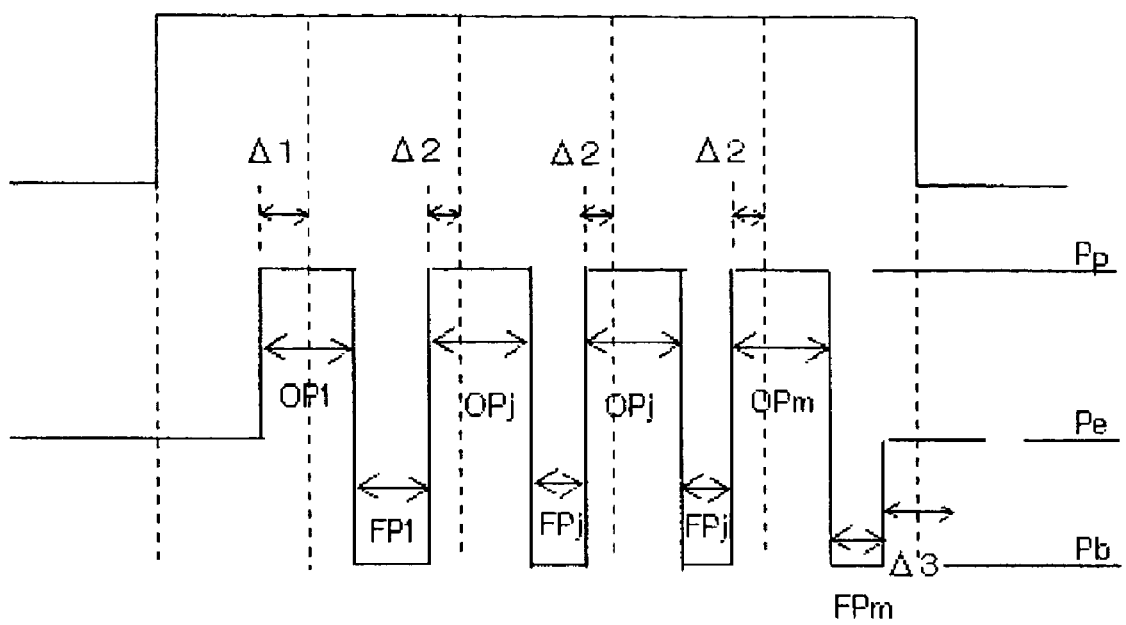
FIG. 2 is a diagram showing an example of a light emission waveform used to perform recording and erasure of the prior art.

FIG. 2 is a light emission waveform used conventionally to perform recording/erasing. As irradiation powers, there are peak power (Pp), erasing power (Pe) and bias power (Pb). As a pulse pattern, there are a front heating pulse OP1, an intermediate heating pulse OPj (j=2 to m−1), and a rear heating pulse OPm, at which the peak power (recording power) is applied, for heating the recording layer. In addition, there are cooling pulses of a front cooling pulse FPl and an intermediate cooling pulse FPj. Here, the sum of the time of the intermediate heating pulse OPj and the intermediate cooling pulse FPj, is T.

The number of pulses is (n−1) or (n−2) relative to the record mark length nT. Up to a linear velocity of 2.4×, a record mark of predetermined length can be recorded while adjusting Δ2=0, Δ1 to a maximum of 0.5*T, and Δ3 to from 0T to 0.5T. Up to a linear velocity of 2.4×, good recording characteristics are obtained. However, the recording linear velocity becomes higher and the linear velocity reaches 4× (14 m/s), according to this method, it becomes more difficult to acquire sufficient overwrite characteristics.

In the case of the aforesaid phase-change optical recording medium, at a linear velocity of 4×, the more the erasing power is increased, and the longer a rear cooling pulse FPm is lengthened, hence the worse are the first overwrite characteristics. This means that the erasure rate of previous record marks is worse. This is because the mark length of the amorphous phase region of the record mark rear edge widens, and the mark length increases. As the optimal range of erasing power is narrow, the recrystallization rate is slower. In other words, the recording layer is sufficiently heated, and the velocity is reduced to grow the crystals at a lower temperature than the fastest speed at which crystals grow from the molten state.

For this purpose, in the present invention, at least at the maximum recording velocity, by completing the ending time of the rear pulse T−OPm earlier than the record mark ending part, overwrite characteristics can be improved. In other words, it is effective to make the rear cooling pulse width zero, or to shorten it as much as possible.

In the present invention, moreover, at least at one recording linear velocity, by starting a front pulse, i.e., a front pulse of the peak power 0.5T to 1.25T later than a starting point of the first reference clock relative to the mark, jitter can be suitably controlled at a low level.

It is also effective to apply these conditions to a range from the intermediate linear velocity to the maximum linear velocity among recordable linear velocities ranges to the phase-change optical recording medium. This means assigning a maximum width of T−OPm to "dTera" relative to the position b of FIG. 3.

Here, the intermediate recording linear velocity is 2.4× which corresponds to 3.49×2.4 m/s and the maximum recording linear velocity is 4× which corresponds to 3.49×4 m/s in that case.

Figure 3:
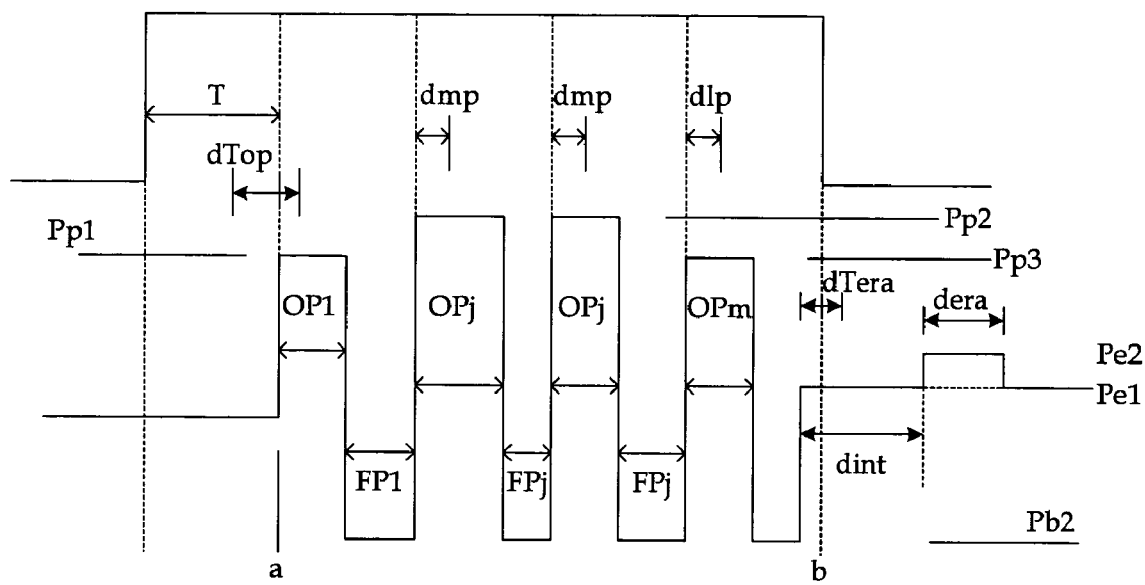
FIG. 3 is a diagram showing an example of a light emission waveform used to perform recording and erasure according to the present invention.

In FIG. 3, "dTop" is a variable range of a starting time of a front heating pulse relative to "a" (a: the position which is 1T delayed from the starting point of the first reference clock relative to the recording mark). If the front heating pulse starts earlier than position "a", it is assigned (+) and if it starts later, it is assigned (−). Therefore, if it is 0.5T to 1.25T delayed from the starting point of the first reference clock relative to the recording mark, "dTop" lies within a variable range of −0.25 to +0.5T. "OP" is the irradiation time of the peak power Pp (heating pulse). "OPl" is the irradiation time of Pp of the front pulse. "OPj (j=2−(m−1))" is the irradiation time of Pp of the intermediate pulse. "OPm" is the irradiation time of Pp of the rear pulse. "FP" is the irradiation time of the bias power Pb (cooling pulse). "FPl" is the irradiation time of Pb of the front pulse. "FPj (j=2−(m−1))" is the irradiation time of Pb of the intermediate pulse. "FPm" is the irradiation time of Pb of the rear pulse. "dmp" is the variable range of the starting time of the intermediate heating pulse. "dlp" is the variable range of the starting time of the rear heating pulse. "dTera" is the variable range of the ending time of the rear cooling pulse relative to "b" of FIG. 3. If the rear cooling pulse ends earlier than position "b", it is assigned (+) and if it ends later, it is assigned (−). "dint" is the time from the end position of the rear cooling pulse to the starting position of the compensation pulse. "dera" is the irradiation time of the second erasing power (Pe2). In the above-mentioned FIG. 3, "Pe2" has is the same value as "Pe1", and "dint" and "dera" are 0.

Subsequently, with Pe2>Pe1, Pe2 is a power for which, if continuous irradiation is performed at the recording linear velocity, the reflectance does not decrease compared to its value prior to irradiation. A compensation pulse which sets a time dint for irradiating the erasing power Pe1 and a time dera for irradiating Pe2 from the ending time of the rear cooling pulse to optimal times, is added. This multipulse pattern may comprise one or more compensation pulses if necessary.

This compensation pulse may be applied to recording of all record mark lengths or to shorter record mark lengths. In this case, record mark length is preferably 3T, 4T, and 5T. All of these, 3T alone, or 3T and 4T are preferable (there is no case of 3T, 5T, or 5T only). In particular, although the shortest record mark length is 3T in DVD, it may be applied only when recording is performed to form record mark length of 3T, 4T or 5T. These compensation pulses eliminate data remaining after erasing in a course of overwriting. For this reason, they are required in order to promote recrystallization. In addition to the present purpose, this compensation pulse becomes more effective as the recording linear velocity increases. The higher is the recording linear velocity, the more time is required from when the erasing power is irradiated to raise the temperature of the recording layer to the temperature of the molten state.

However, if it is attempted to increase the erasing power Pe1, as this power is irradiated continuously or at regular intervals until the next mark is recorded, the recrystallization region widens, or due to the higher linear velocity together with the quenching effect, the amorphous phase region widens. Hence, by providing the compensation pulse, control of the rear edge of the record mark is easier. The optimal times for dera and dint are 0.2T<dera<3T and 0<dint<1T respectively. As a result, the erasing rate after the first overwriting are improved, and jitter characteristics improve. The range of each heating pulse width OPk (k=1, . . . m) is 0.2T to 0.8T. In the case of DVD, when it is applied to from 1× to 4× and recording is made by CAV from 1× to 2.4×, the reference clock corresponding to each linear velocity varies continuously, but an optimal recording is attained by adjusting each heating pulse width by the sum of a time proportional to the reference clock T and a fixed time independent from the reference clock.

Specifically, this is (1/a) T*i+b*j (a, b, i, j are integers [nanoseconds]).

For recording at 4×, a=16, and to increase control time resolution, the pulse width is set to T*i (1/16), which is mainly used in CLV. To control from 1.7× to 4× by CAV, a=16 and b=1, and (1/16) T*i+1*j is used.

The sum of the front heating pulse and the front of cooling pulse, the sum of the intermediate heating pulse and the intermediate cooling pulse, and the sum of the rear heating pulse and the rear cooling pulse are basically 1T, but the sum of the front heating pulse and the heat of cooling pulse and the sum of the rear heating pulse and the rear cooling pulse are not limited thereto.

By adjusting the aforesaid sums within a range from 0.3T to 1.5T, a record mark of predetermined length can be recorded.

In CAV recording from 1× to 2.4×, the pulse width is adjusted by T*i(1/6)+2*j.

EXAMPLES

Hereafter, the method of the present invention will be described referring to specific examples.

Example 1

A phase-change optical recording medium was prepared as follows.

As a transparent substrate in which record marks are formed in the groove thereon, a polycarbonate substrate having a groove pitch of 0.74 µm, a groove width of 0.25 µm, a groove depth of 25 nm and a thickness of 0.6 mm was used. Each layers was formed on the transparent substrate by the sputtering method. Address information was provided in a wobble of the groove having a frequency of 818 kHz, with 180 degrees reversed phase depending on the information.

The lower dielectric protective layer was formed with thickness of 69 nm on the aforesaid substrate using a target of $ZnS:SiO_2=80:20$ (mol %). Next, the phase-change recording layer which is $Ge:Ag:In:Sb:Te=3:0.8:3.5:72:20.7$ was formed so that its thickness was 14 nm. Next, the interface layer was formed so that its thickness was 2 nm using a multiple oxide target of $ZrO_2:TiO_2:Y_2O_3=49:45:6$ (mol %). Next, a upper dielectric protective layer was formed to a thickness of 11 nm using a target of $ZnS:SiO_2=80:20$ (mol %). A SiC layer of thickness 4 nm and Ag layer of thickness of 140 nm were formed thereupon. Next, to improve environmental resistance, an ultraviolet curing resin (SD318, Dainippon Ink and Chemicals, Incorporated.) was applied and hardened so as to form an environmental protection layer having a thickness of 5 µm. Finally, the aforesaid transparent substrate was affixed to the environmental protection later via an ultraviolet curing resin layer (DVD 003 [acrylic], Nippon Kayaku Co., Ltd.) with a thickness of 40 µm to obtain a phase-change optical recording medium.

Even when this phase-change optical recording medium was subjected to a test at 80° C., and 85% RH, or a heat cycle test between 25° C. and 40° C. at 95% RH, defects did not occur. Next, the aforesaid recording layer was crystallized using a large caliber LD of wavelength 810 nm (beam diameter: track direction 1 µm×radial direction 75 µm) at a linear velocity of 9 m/s, power of 900 mW and head feed rate of 18 µm/rotation.

When DC light of 12 mW was irradiated to the phase-change optical recording medium by the optical head equipping the LD with continuously changing the linear velocity, reflectance began to decrease from the vicinity of a linear velocity of 9.5 m/s. Recording and reproduction were performed using a pickup head having a wavelength of 657 nm and an object lens NA of 0.65, and recording was performed at a maximum linear velocity of 14 m/s to give a recording density of 0.267 µm. The mode of modulating recording data was (8, 16) modulation. Recording was performed so that the recording power was a maximum of 19 mW, the bias power was 0.5 mW and the erasing power was 30% of the recording power. The number of pulses of each mark length is (n−1) (n=3-14).

The conditions in the case of recording by CLV at a linear velocity of 14 m/s (4×) and by CAV at a linear velocity of from 1× to 2.4× are shown in Table 1. Herein, "dTop" is written as "dTtop", "OPl" is written as "Ttop", "OPj", and "OPm" are written as "Tmp". Also, "dmp", "dlp", "dint" and "dera" were all set to zero. These conditions are based on the method of FIG. 3.

In addition, "dTtop" shown in the table 1 was measured based from "a" of FIG. 3. When the starting time of the front pulse is earlier than "a" it is assigned (+) and if it starts later, it is assigned (−). Looking at the starting position of record mark (the time T earlier than a), "a" corresponds "dTtop=1T". "−0.25T" refers to the position 1.25T apart from the record mark starting position, and "0.5T" refers to the position 0.5T apart from the recording marl starting position. Here, the record mark starting position corresponds to a starting point of the first reference clock.

TABLE 1

| Linear velocity | 14 m/s | 8.4 m/s | 35 m/s |
|---|---|---|---|
| Reference clock: T | 9.55 nsec. | 15.67 nsec. | 38.22 nsec. |
| Parameters (nsec) | | | |
| dTtop | −(2/16)*T | | (2/6)*T |
| Ttop | (5/16)*T + 2 | | (2/6)*T + 6 |
| Tmp | (6/16)*T + 2 | | (1/6)*T + 4 |
| Tmp | (6/16)*T + 2 | | (1/6)*T + 4 |
| dTera | (6/16)*T | | (1/6)*T |

Figure 4:
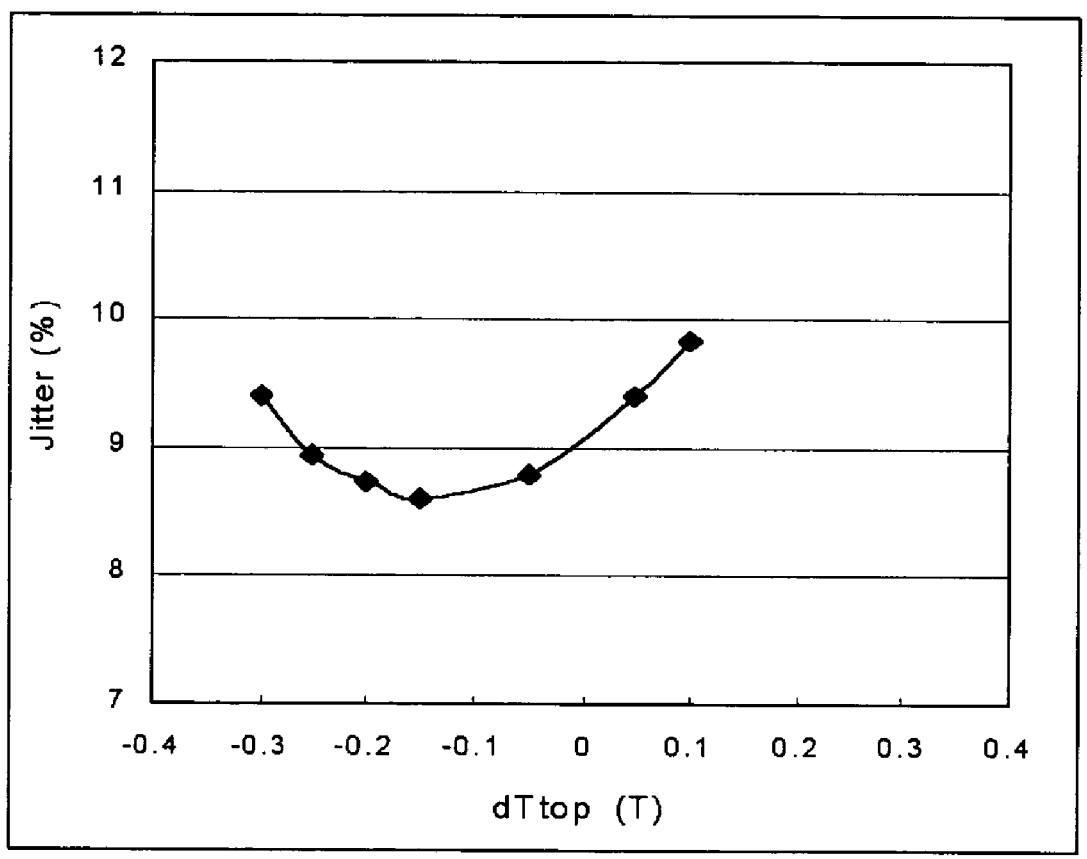
FIG. 4 is a graph showing the dTtop dependency of jitter after one overwrite at a linear velocity of 14 m/s.

The "dTtop" dependency of jitter after one overwriting at a linear velocity of 14 m/s is shown in FIG. 4. The recording power is 17 mW. By delaying the starting position, the jitter margin widens. In the prior art, "dTtop" of FIG. 4 was more than zero, and the jitter after one overwrite exceeded 9%. Even the case of 9% or less was within the range of 0 to 0.25T, the margin was narrow. For this reason, "dTtop" must be finely controlled to approximately ¹⁄₁₆ of the reference clock.

Figure 5:
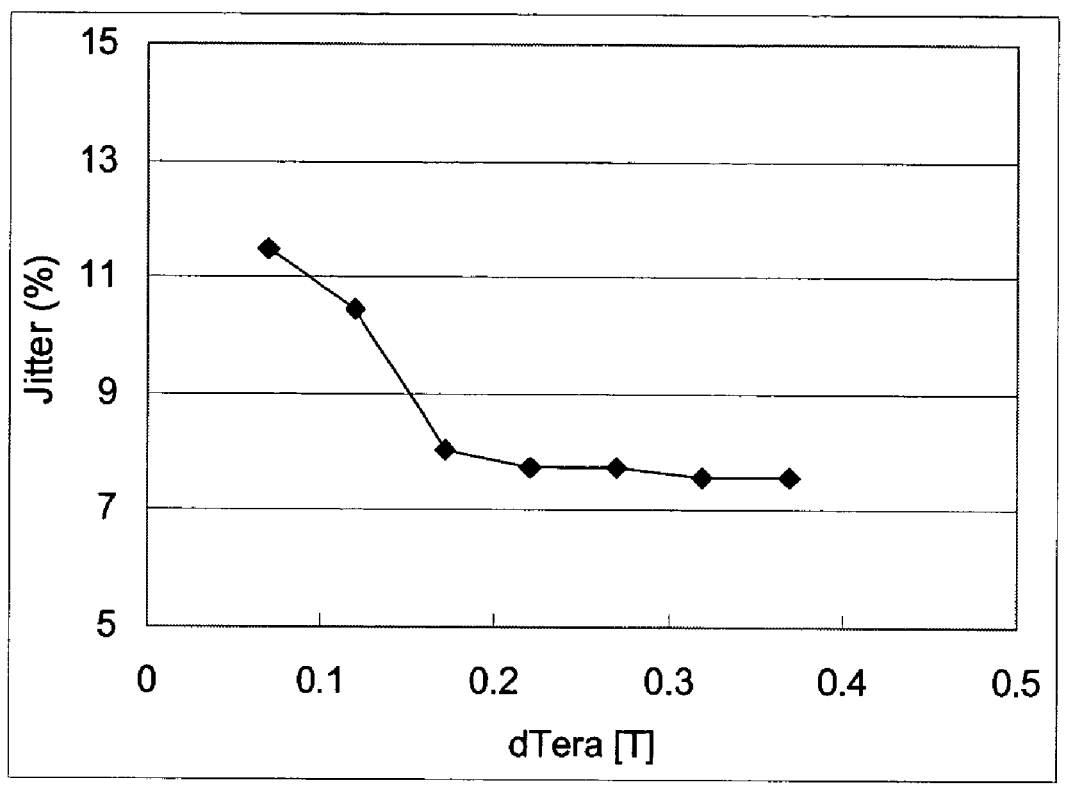
FIG. 5 is a graph showing the relation between jitter and dTera.
Figure 6:
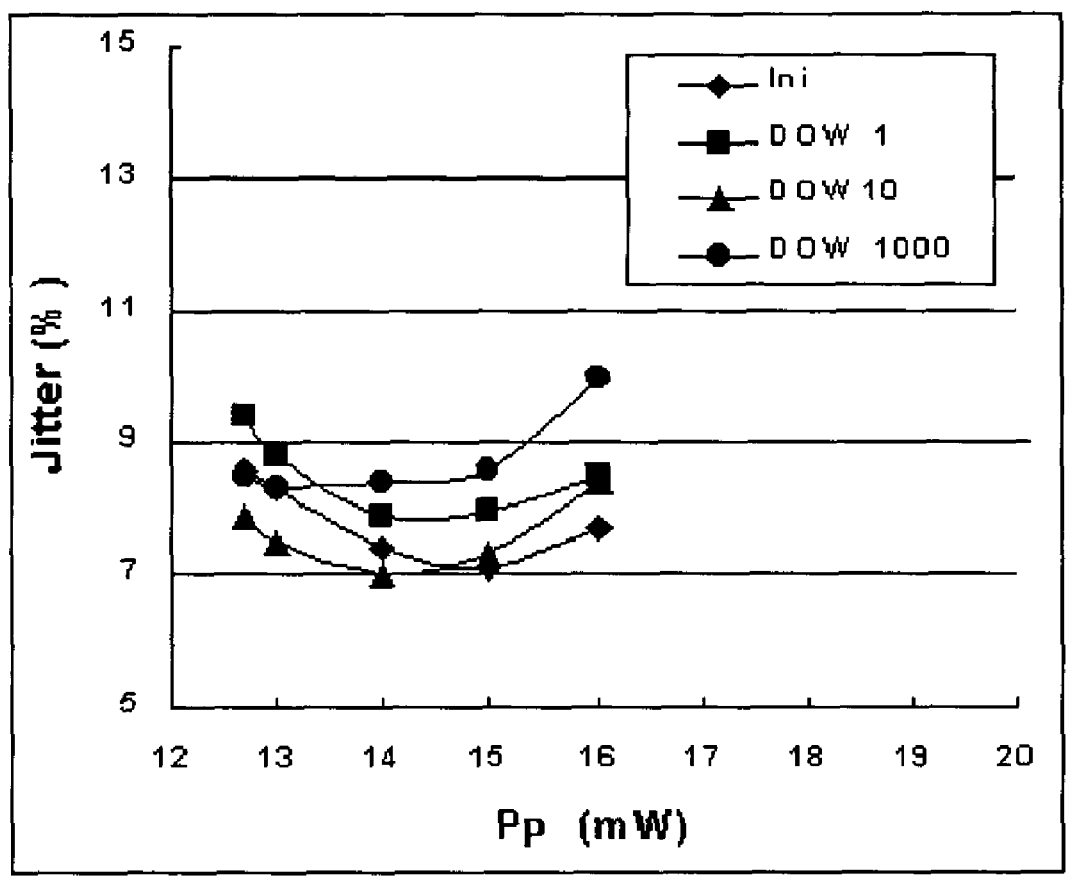
FIG. 6 is a graph showing the relation between jitter and power margin.
Figure 7:
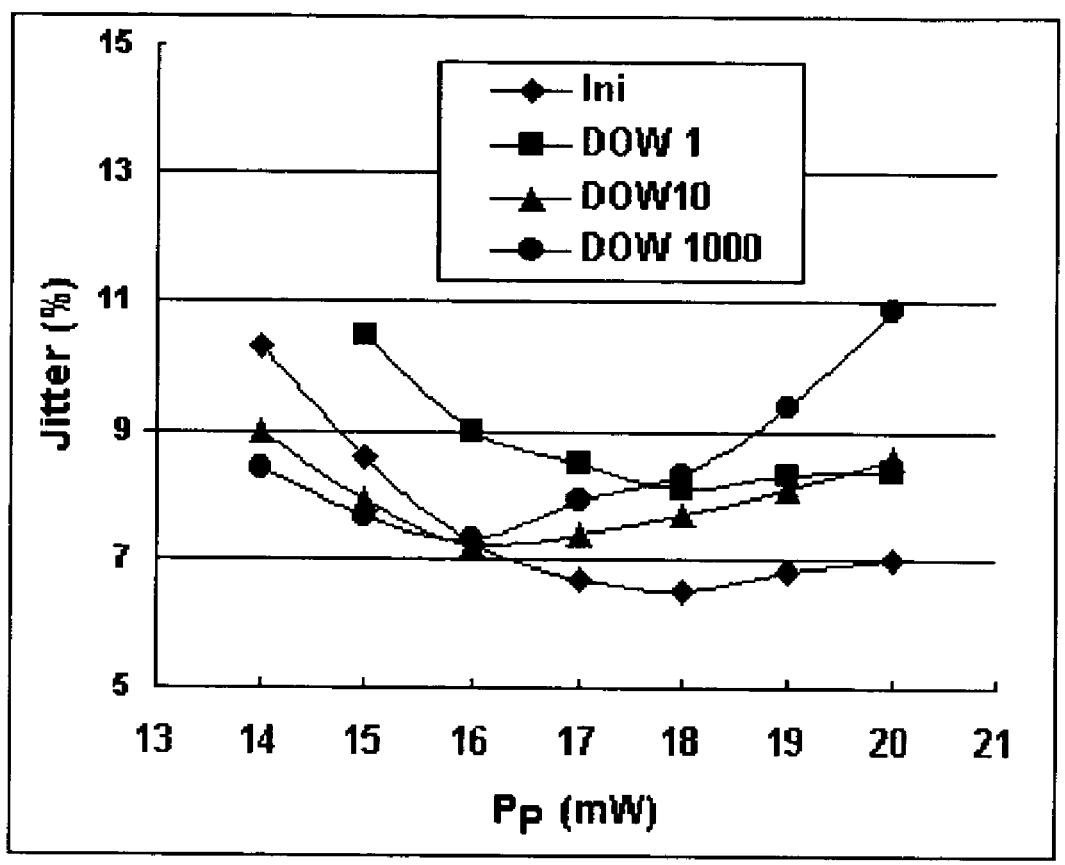
FIG. 7 is another graph showing the relation between jitter and power margin.

From FIG. 5, it is seen that the earlier the ending time of the cooling pulse at the rear edge (+side) is finished, the better are the characteristics. The power margin of the jitter during recording at a recording linear velocity of 2.4× and 4× for recording under the conditions of Table 1 which reflects these conditions, is shown in FIGS. 6 and 7. A 4× recording power margin is guaranteed, and for 2.4×, there is a large margin under a recording power of 15 mW, so 4× recording is possible and there is downward compatibility.

Example 2

Using the same phase-change optical recording medium as in Example 1, as shown in Table 2, in the case of 4× recording, the pulse width was adjusted by a time proportional to a reference clock, and "dTera" was taken as T-Tmp. In the case of CAV recording at an intermediate linear velocity which is corresponded to a range of 8.4 m/s to 3.5 m/s when the maximum linear velocity is 14 m/s and minimum linear velocity is 3.5 m/s, as shown in Table 2, the pulse width was adjusted by a time proportional to the reference clock and a fixed time.

As a result, for a linear velocity of 14 m/s, recording was performed at a recording power of 17 mW and erasing power of 5.3 mW. For 8.4 m/s and 3.5 m/s, recording was performed at a recording power of 15 mW and erasing power of 7.5 mW. In all cases, the jitter was 9% or less up to 1,000 times of overwriting.

TABLE 2

| Linear velocity | 14 m/s | 8.4 m/s | 35 m/s |
|---|---|---|---|
| Reference clock: T | 9.55 nsec. | 15.67 nsec. | 38.22 nsec. |
| Parameters (nsec) | | | |
| dTtop | $-(2/16)*T$ | | $(2/6)*T$ |
| Ttop | $(9/16)*T$ | | $(2/6)*T + 6$ |
| Tmp | $(9/16)*T$ | | $(1/6)*T + 4$ |
| Tmp | $(9/16)*T$ | | $(1/6)*T + 4$ |
| dTera | $(7/16)*T$ | | $(1/6)*T$ |

Example 3

The same phase-change optical recording medium as in Example 1 was used, and the recording layer material was Ge:Ag:In:Sb:Te=2:0.5:3.5:72.5:21.5. The pulse width was adjusted by a time proportional to a recording linear velocity of 6 m/s exceeding ⅓ of the maximum linear velocity of 14 m/s, and, a time which was proportional to the reference clock of 14 m/s, and a fixed time, and CAV recording was performed. At 6 m/s and 8.4 m/s, the recording power was 15 mW, at 14 m/s the recording power was 18 mW, and the jitter was 9% in all cases. The recording conditions are shown in Table 3.

TABLE 3

| Linear velocity | 14 m/s | 6 m/s |
|---|---|---|
| Reference clock: T | 9.55 nsec. | 22.22 nsec. |
| Parameters (nsec) | | |
| DTtop | $-(2/16)*T$ | $2/6 *T$ |
| Ttop | $(6/16)*T + 1.8$ | |
| Tmp | $(6/16)*T + 1.8$ | |
| Tmp | $(6/16)*T + 1.8$ | |
| DTera | $(6/16)*T$ | 0 |

Example 4

The same phase-change optical recording medium as in Example 1 was used, and recording was performed at a recording linear velocity of 14 m/s and recording power of 17 mW. The recording conditions are as shown in Table 4. Each pulse width was adjusted to a time which was proportional to the reference clock. For record marks from 3T to 14T, the compensation pulse was applied only when recording the record mark of 3T. The erasing powers were Pe1=5.3 mW and Pe2=6.0 mW. The compensation pulse starting time was set to dint=0T and the compensation pulse irradiation time (pulse width) was set to dera=0.5T. As a result, when there is 9% jitter on the first overwriting without a compensation pulse, the jitter was 8% with the compensation pulse. When there is 8% jitter after 1,000 times of overwriting without the compensation pulse, the jitter was 7.5% with the compensation pulse after 1,000 times of overwriting. Therefore, there is a large effect in improving the first overwriting where high density and high linear velocity are a problem with a phase-change optical recording medium.

TABLE 4

| Linear velocity | 14 m/s | |
|---|---|---|
| Reference clock: T | 9.55 nsec. | |
| Parameters (nsec) | | |
| DTtop | $-(2/16)*T$ | |
| Ttop | $(9/16)*T$ | |
| Tmp | $(9/16)*T$ | |
| Tmp | $(9/16)*T$ | |
| DTera | $(9/16)*T$ | |
| Dera | $(8/16)*T$ | 3T only |
| | 0 | 4T-14T |
| Pe1 (mW) | 5.3 | |
| Pe2 (mW) | 6 | |

Example 5

Figure 8:
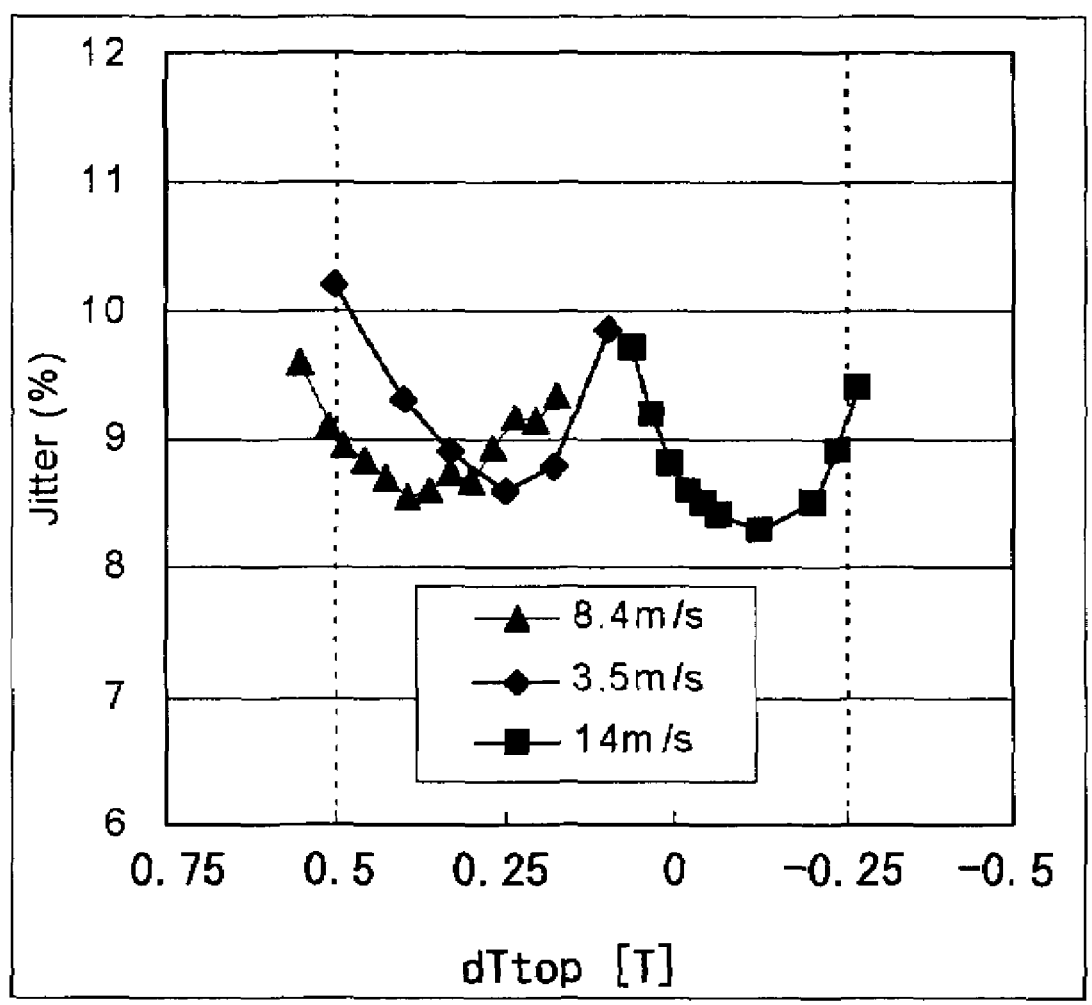
FIG. 8 is a graph showing the dTtop dependencies of jitter with respect to each linear velocity at the first overwriting.

The same phase-change optical recording medium as in Example 1 was used, and the recording condition was also the same as in Example 1 expect dTtop.

dTtop dependency of jitter relative to each recording liner velocity at the first overwriting is shown in FIG. 8.

For the recording linear velocity of 14 m/s, recording was performed at a recording power of 19 mW and an erasing power of 5.7 mW. For the recording linear velocity of 3.5 m/s, recording was performed at a recording power of 16 mW and an erasing power of 8 mW. Especially with the recording linear velocity of 14 m/s, the jitter exceeded 9% in the conventional range of dTtop which was 0T to 0.5T (the starting time of the front pulse starts 0.5T to 1.0T later than the starting point of the first reference clock). When dTtop is more than 0.5T (the starting time of the front pulse starts less than 0.5T later than the starting point of the first reference clock), the jitter exceeded 9% with all recording linear velocities.

Example 6

The same phase-change optical recording medium and the recording method as in Example 1 were used expect that the material of the recording layer was changed to Ge:Ga:Sb:Te=4:2:73:21. Recording was performed at a recording linear velocity of 14 m/s, a recording power 18 mW, the erasing power 5.6 mW. As a result, the jitter remained 9% or less up to 1,000 times of overwriting.

Example 7

The same phase-change optical recording medium and the recording method as in Example 1 were used expect that the material of the recording layer was changed to Ge:Sn:Sb:Te=4.0:4.5:71.0:20.5. Recording was performed at a recording linear velocity of 14 m/s, a recording power 18 mW, the erasing power 5.4 mW. As a result, the jitter remained 9% or less up to 1,000 times of overwriting.

According to the aforesaid first aspect, a recording method can be provided in which there is downward compatibility, recording characteristics are maintained even if there is downward compatibility, and recording characteristics are excellent even at a high linear velocity.

According to the aforesaid second aspect, a recording method is provided which permits CAV recording within a predetermined range of recording linear velocity from the minimum recording linear velocity range to the maximum recording linear velocity range in which recording can be performed on the phase-change optical recording medium.

According to the aforesaid third aspect, a recording method is provided which permits the recording property margin to be widened.

According to the aforesaid fourth aspect, a recording method is provided which has excellent overwrite characteristics at a high recording linear velocity.

What is claimed is:

1. A recording method for a phase-change optical recording medium, comprising the step of:
    irradiating an electromagnetic wave to a phase-change optical recording medium containing phase-change layer at least at a recording linear velocity according to a multipulse pattern so as to perform writing and rewriting by inducing a reversible phase change between a non-crystalline phase and a crystalline phase and utilizing a variation in optical constant cased by the reversible phase change,
    wherein the multipulse pattern contains pulses of a peak power (Pp), an erasing power (Pe) and a bias power (Pb),
    wherein a starting time of a front pulse when forming a mark, that is a front pulse of the peak power, starts 0.5T to 1.25T later than a starting point of the first reference clock relative to the mark at least at a recording linear velocity, where T is a reference clock of the multipulse pattern,
    wherein an ending time of a rear pulse, that is one of a rear pulse of the peak power and a rear pulse of the bias power, ends T-OPm earlier than an ending point of the last reference clock relative to the mark with at least one recording linear velocity, where OPm is a irradiating time of the peak power relative to the rear pulse thereof.

2. A recording method for a phase-change optical recording medium according to claim 1, wherein writing and overwriting are performed at a plurality of recording linear velocities, and the ending time of the rear pulse ends T-OPm earlier than the ending point of the last reference clock at least at a maximum linear velocity among the recording linear velocities.

3. A recording method for a phase-change optical recording medium according to claim 2, wherein the ending time of the rear pulse ends T-OPm earlier than the ending point of the last reference clock at least at an intermediate or faster velocity among the recording linear velocities.

4. A recording method for a phase-change optical recording medium, comprising the step of:
    irradiating an electromagnetic wave to a phase-change optical recording medium containing phase-change layer at least at a recording linear velocity according to a multipulse pattern so as to perform writing and rewriting by inducing a reversible phase change between a non-crystalline phase and a crystalline phase and utilizing a variation in optical constant cased by the reversible phase change,
    wherein the multipulse pattern contains pulses of a peak power (Pp), an erasing power (Pe) and a bias power (Pb),
    wherein a starting time of a front pulse when forming a mark, that is a front pulse of the peak power, starts 0.5T to 1.25T later than a starting point of the first reference clock relative to the mark at least at a recording linear velocity, where T is a reference clock of the multipulse pattern,
    wherein writing and overwriting are performed at a plurality of recording linear velocities, and an irradiating time (OP) of the peak power of a front pulse, an intermediate pulse and a rear pulse, is adjusted with a sum of a time being proportional to a reference clock relative to each recording linear velocity and a time being independent from the reference clock, at least at a minimum linear velocity among the recording linear velocities.

5. A recording method for a phase-change optical recording medium according to claim 1, wherein writing and overwriting are performed at a plurality of recording linear velocities, and an irradiating time (OP) of the peak power of a front pulse, an intermediate pulse and a rear pulse, is adjusted with a sum of a time being proportional to a reference clock relative to each recording linear velocity and a time being independent from the reference clock, at least at a minimum linear velocity among the recording linear velocities.

6. A recording method for a phase-change optical recording medium according to claim 4, wherein the irradiating time (OP) of the peak power of the front pulse, the intermediate pulse, and the rear pulse, is adjusted with the sum of the time being proportional to the reference clock relative to each recording linear velocity and the time being independent from the reference clock, at the minimum linear velocity to an intermediate linear velocity among the recording linear velocities.

7. A recording method for a phase-change optical recording medium according to claim 4, wherein the irradiating time (OP) of the peak power of the front pulse, the intermediate pulse, and the rear pulse, is adjusted with the sum of the time being proportional to the reference clock relative to each recording linear velocity and the time being independent from the reference clock, at any linear velocity among the recording linear velocities.

8. A recording method for a phase-change optical recording medium, comprising the step of:
    irradiating an electromagnetic wave to a phase-change optical recording medium containing phase-change layer at least at a recording linear velocity according to a multipulse pattern so as to perform writing and rewriting by inducing a reversible phase change between a non-crystalline phase and a crystalline phase and utilizing a variation in optical constant cased by the reversible phase change,
    wherein the multipulse pattern contains pulses of a peak power (Pp), an erasing power (Pe) and a bias power (Pb),
    wherein a starting time of a front pulse when forming a mark, that is a front pulse of the peak power, starts 0.5T to 1.25T later than a starting point of the first reference clock relative to the mark at least at a recording linear velocity, where T is a reference clock of the multipulse pattern,
    wherein writing and overwriting are performed at a plurality of recording linear velocities, and an irradiating time (OP) of the peak power of a front pulse, an intermediate pulse and a rear pulse, is adjusted with a time being proportional to a reference clock relative to each recording linear velocity, at least at a minimum linear velocity among the recording linear velocities.

9. A recording method for a phase-change optical recording medium according to claim 8, wherein the irradiating time (OP) of the peak power of a front pulse, an intermediate pulse and a rear pulse, is adjusted with the time being proportional to the reference clock relative to each recording linear velocity, at one-third of a maximum linear velocity to the maximum linear velocity among the recording linear velocities.

10. A recording method for a phase-change optical recording medium according to claim 4, wherein the irradiating time (OP) of the peak power of any pulse, is adjusted with the sum of the time being proportional to a reference clock relative to each recording linear velocity and the time being independent from the reference clock at a maximum linear velocity among the recording linear velocities, and the time being independent from the clock reference is 0.5 nano seconds or more.

11. A recording method for a phase-change optical recording medium according to claim 4, wherein the recording linear velocity continuously changes along a radius direction from an inner circumference to an outer circumference of the phase-change optical recording medium.

12. A recording method for a phase-change optical recording medium, comprising the step of:
   irradiating an electromagnetic wave to a phase-change optical recording medium containing phase-change layer at least at a recording linear velocity according to a multipulse pattern so as to perform writing and rewriting by inducing a reversible phase change between a non-crystalline phase and a crystalline phase and utilizing a variation in optical constant cased by the reversible phase change,
   wherein the multipulse pattern contains pulses of a peak power (Pp), an erasing power (Pe) and a bias power (Pb),
   wherein a starting time of a front pulse when forming a mark, that is a front pulse of the peak power, starts 0.5T to 1.25T later than a starting point of the first reference clock relative to the mark at least at a recording linear velocity, where T is a reference clock of the multipulse pattern,
   wherein the multipulse pattern, relative to at least the shortest mark among record marks, further contains at least one compensation pulse including a pulse of the erasing power and a pulse of a second erasing power which is higher than the erasing power, after the rear cooling pulse, where recording is performed with at least a recording linear velocity.

13. A recording method for a phase-change optical recording medium according to claim 1, wherein the multipulse pattern, relative to at least the shortest mark among record marks, further contains at least one compensation pulse including a pulse of the erasing power and a pulse of a second erasing power which is higher than the erasing power, after the rear cooling pulse, where recording is performed with at least a recording linear velocity.

14. A recording method for a phase-change optical recording medium according to claim 12, wherein writing and overwriting are performed at a plurality of recording linear velocities that are one of continuous and interval, the multipulse pattern contains at least one compensation pulse in the case that recording is performed at least at the maximum linear velocity among the recording linear velocities.

* * * * *